(12) United States Patent
Park et al.

(10) Patent No.: US 10,627,501 B2
(45) Date of Patent: Apr. 21, 2020

(54) PULSE RADAR APPARATUS AND OPERATING METHOD OF PULSE RADAR APPARATUS

(71) Applicant: Electronics and Telecommunications Research Institute, Daejeon (KR)

(72) Inventors: Pil Jae Park, Daejeon (KR); Seong Do Kim, Daejeon (KR); Ki Su Kim, Sejong (KR); Mun Yang Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 487 days.

(21) Appl. No.: 15/401,909

(22) Filed: Jan. 9, 2017

(65) Prior Publication Data
US 2017/0285138 A1 Oct. 5, 2017

(30) Foreign Application Priority Data
Mar. 31, 2016 (KR) .................. 10-2016-0038917

(51) Int. Cl.
*G01S 13/10* (2006.01)
*G01S 7/285* (2006.01)
*G01S 13/28* (2006.01)

(52) U.S. Cl.
CPC .............. *G01S 13/10* (2013.01); *G01S 7/285* (2013.01); *G01S 13/282* (2013.01)

(58) Field of Classification Search
CPC .......... G01S 13/00; G01S 13/02; G01S 13/10; G01S 13/12; G01S 13/18; G01S 13/58; G01S 7/28; G01S 7/285; G01S 7/282; G01S 7/40; G01S 7/354; G01S 7/4021; G01S 7/406; G01S 7/4065; G01S 13/282; G01S 7/032; G01S 7/4008; H03D 3/02;
(Continued)

(56) References Cited

U.S. PATENT DOCUMENTS 5,757,531 A * 5/1998 Tomesen ................ H04B 10/60
398/204
5,805,110 A 9/1998 McEwan
(Continued)

OTHER PUBLICATIONS

Anh Tuan Phan et al., "Low-Power Sliding Correlation CMOS UWB Pulsed Radar Receiver for Motion Detection", 2009, pp. 1541-1544, IEEE.

*Primary Examiner* — Olumide Ajibade Akonai (57) ABSTRACT

Disclosed are a pulse radar apparatus and an operating method of the pulse radar apparatus, the pulse radar apparatus including a transmitter configured to receive a reference signal as a transmission clock signal, and transmit a transmission pulse to an object based on the transmission clock signal, a negative feedback loop configured to delay the reference signal and output the delayed reference signal as a reception clock signal, and a receiver configured to restore, based on the reception clock signal, a reflection pulse received in response to the transmission pulse being reflected from the object, wherein the negative feedback loop is configured to generate a delay control signal using the reference signal and a predetermined waveform signal generated by a waveform generator, delay the reference signal based on the delay control signal, and adjust the delay control signal by controlling the waveform generator to change the predetermined waveform signal.

17 Claims, 5 Drawing Sheets

(58) Field of Classification Search
CPC .......... H03D 3/24; H03D 3/241; H03D 3/242; H03D 3/245; H03D 3/247; H03D 3/26; H03L 2207/50; H03L 7/085
See application file for complete search history.

(56) References Cited

U.S. PATENT DOCUMENTS

| | | | |
|---|---|---|---|
| 6,055,287 A * | 4/2000 | McEwan | G01S 13/18 327/156 |
| 6,373,428 B1 * | 4/2002 | McEwan | G01S 7/28 331/46 |
| 7,259,716 B1 * | 8/2007 | Dubbert | G01S 7/28 342/131 |
| 7,551,703 B2 | 6/2009 | McEwan | |
| 7,675,459 B2 | 3/2010 | Yoshimura | |
| 2007/0177704 A1 * | 8/2007 | McEwan | G01S 7/28 375/376 |
| 2007/0210955 A1 * | 9/2007 | McEwan | G01S 7/285 342/175 |
| 2010/0283659 A1 * | 11/2010 | Huggett | G01S 7/021 342/20 |
| 2012/0262330 A1 | 10/2012 | Park et al. | |
| 2014/0159943 A1 * | 6/2014 | Jaeger | G01S 7/354 342/90 |
| 2014/0294060 A1 | 10/2014 | Yang | |
| 2014/0354469 A1 | 12/2014 | Park et al. | |
| 2017/0010345 A1 * | 1/2017 | Mitchell | G01S 7/2921 |

\* cited by examiner

PULSE RADAR APPARATUS AND OPERATING METHOD OF PULSE RADAR APPARATUS

CROSS-REFERENCE TO RELATED APPLICATION(S)

This application claims the priority benefit of Korean Patent Application No. 10-2016-0038917 filed on Mar. 31, 2016, in the Korean Intellectual Property Office, the disclosure of which is incorporated herein by reference for all purposes.

BACKGROUND

1. Field

One or more example embodiments relate to technology that may control a delay between a transmission clock signal and a reception clock signal using a negative feedback loop to generate a pulse radar clock.

2. Description of Related Art

A pulse radar apparatus may acquire information related to an object, for example, a target, by transmitting a transmission pulse at a repetition frequency, receiving a reflection pulse, for example, an echo signal, reflected by the object and returned, and analyzing the reflection pulse.

The pulse radar apparatus may transmit the transmission pulse based on a transmissions clock signal, and restore a reception pulse received from the object based on a reception clock signal. In this example, the pulse radar apparatus may delay the transmission clock signal by a set value, and use the delayed transmission clock signal as the reception clock signal. By conveniently controlling a delay between the transmission clock signal and the reception clock signal in a radar scheme using transmission and reception clocks, radar control performance increase, and thus radar utilization may improve.

SUMMARY

An aspect provides technology that may flexibly control a delay between a transmission clock signal and a reception clock signal by delaying the transmission clock signal based on a delay control signal and using the delayed transmission clock signal as the reception clock signal, and adjusting the delay control signal through a negative feedback loop.

According to an aspect, there is provided a pulse radar apparatus including a transmitter configured to receive a reference signal as a transmission clock signal, and transmit a transmission pulse to an object based on the transmission clock signal, a negative feedback loop configured to delay the reference signal and output the delayed reference signal as a reception clock signal, and a receiver configured to restore, based on the reception clock signal, a reflection pulse received in response to the transmission pulse being reflected from the object. The negative feedback loop may be configured to generate a delay control signal using the reference signal and a predetermined waveform signal generated by a waveform generator, delay the reference signal based on the delay control signal, and adjust the delay control signal by controlling the waveform generator to change the predetermined waveform signal and generate the changed predetermined waveform signal.

According to another aspect, there is also provided an operating method of a pulse radar apparatus, the method including receiving a reference signal as a transmission clock signal, and transmitting a transmission pulse to an object based on the transmission clock signal, delaying the reference signal and outputting the delayed reference signal as a reception clock signal, and restoring, based on the reception clock signal, a reflection pulse received in response to the transmission pulse being reflected from the object. The delaying and outputting may include generating a delay control signal using the reference signal and a predetermined waveform signal generated by a waveform generator, and delaying the reference signal based on the delay control signal, and adjusting the delay control signal by controlling the waveform generator to change the predetermined waveform signal and generate the changed predetermined waveform signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

A pulse radar apparatus and an operating method of the pulse radar apparatus according to an example embodiment will be described below in detail with reference to the accompanying drawings.

Figure 1:
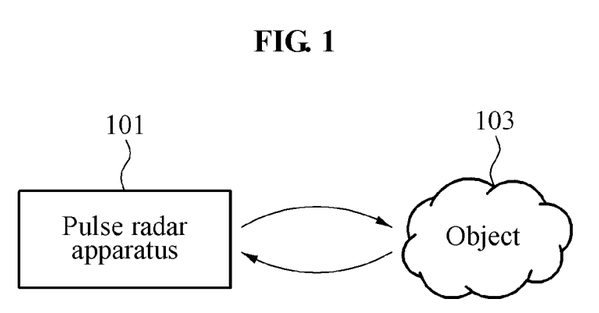
FIG. 1 is a diagram illustrating an example of operation of a pulse radar apparatus according to an example embodiment.

FIG. 1 is a diagram illustrating an example of operation of a pulse radar apparatus according to an example embodiment.

Referring to FIG. 1, a pulse radar apparatus 101 according to an example embodiment may transmit a transmission pulse to an object 103 based on a transmission clock signal.

The pulse radar apparatus 101 may flexibly control a delay between the transmission clock signal and the reception clock signal by delaying the transmission clock signal based on a delay control signal and using the delayed transmission clock signal as a reception clock signal, and adjusting the delay control signal associated with the delay through a negative feedback loop.

The pulse radar apparatus 101 may receive a reflection pulse received in response to the transmission pulse being reflected from the object 103 based on the delay-adjusted reception clock signal, and acquire information related to the object 103 by restoring the reflection pulse. The information related to the object 103 may include, for example, a position of the object 103, a distance from the object 103, and a shape of the object 103.

Figure 2:
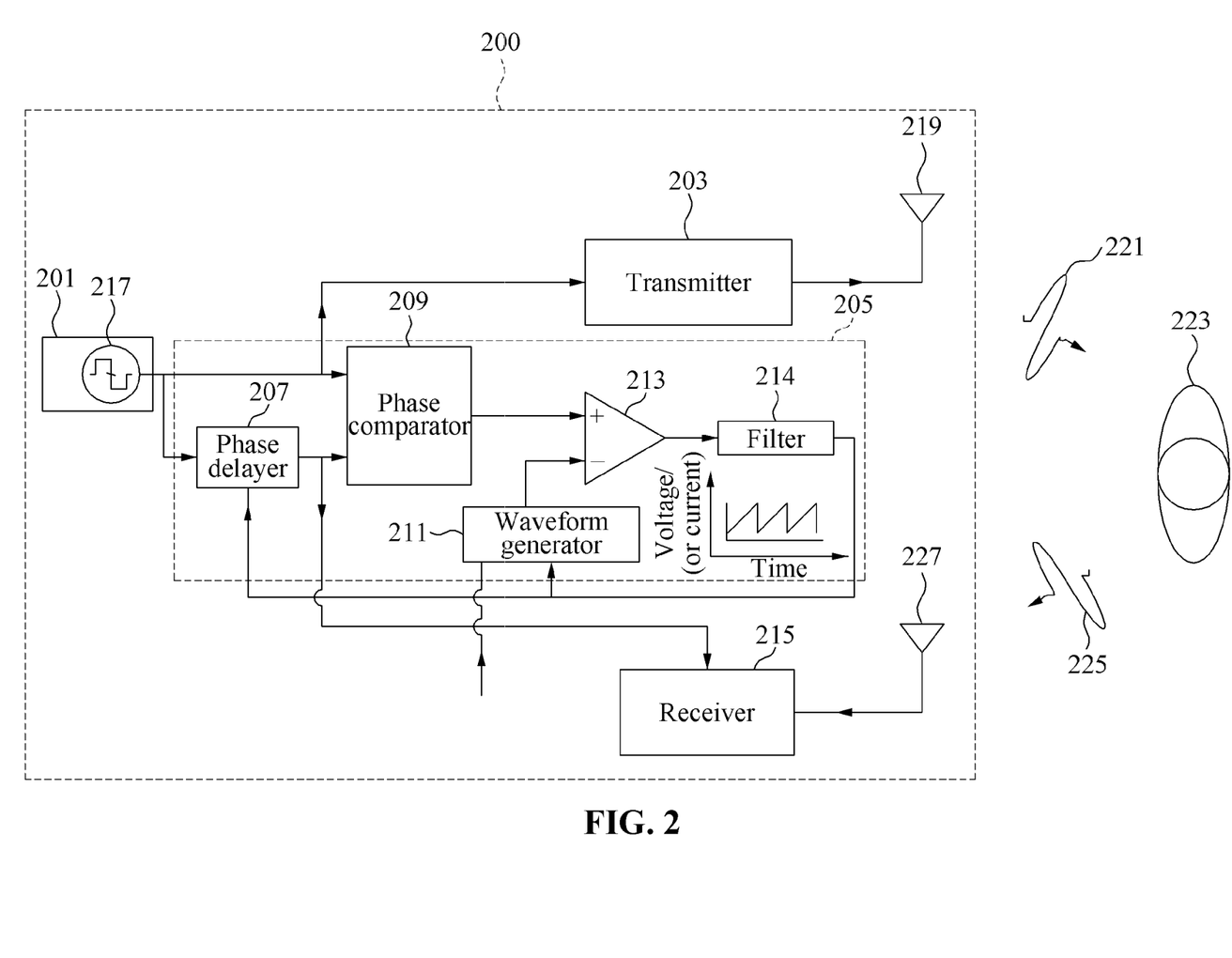
FIG. 2 is a diagram illustrating a configuration of a pulse radar apparatus according to an example embodiment.

FIG. 2 is a diagram illustrating a configuration of a pulse radar apparatus according to an example embodiment.

Referring to FIG. 2, a pulse radar apparatus 200 according to an example embodiment may include a reference signal generator 201, a transmitter 203, a negative feedback loop 205, and a receiver 215.

The reference signal generator 201 may generate a reference signal 217. The reference signal 217 may be generated continuously.

The transmitter 203 may receive the reference signal 217 as a transmission clock signal, and transmit a transmission pulse 221, for example, a high-frequency pulse signal, to an object 223, for example, a target, based on the transmission clock signal through a transmission antenna 219 or a transmission line. The transmitter 203 may generate the transmission pulse 221 synchronized with the transmission clock signal using an oscillator.

The negative feedback loop 205 may delay the reference signal 217, and output the delayed reference signal as a reception clock signal. The negative feedback loop 205 may generate a delay control signal using the reference signal 217 and a predetermined waveform signal generated by a waveform generator 211, delay the reference signal 217 based on the delay control signal, and adjust the delay control signal by controlling the waveform generator 211 to change the predetermined waveform signal and generate the changed predetermined waveform signal, thereby controlling a delay with respect to the transmission clock signal.

In this example, the negative feedback loop 205 may control the waveform generator 211 to change the predetermined waveform signal and generate the changed predetermined waveform signal based on a waveform control signal externally input or a set rule. The negative feedback loop 205 may control the waveform generator 211 to change at least one of a slope or a period of the predetermined waveform signal.

The negative feedback loop 205 may include a phase delayer 207, a phase comparator 209, the waveform generator 211, an error amplifier 213, and a filter 214.

The phase delayer 207 may be, for example, a voltage controlled delay line (VCDL). The phase delayer 207 may delay a phase of an input reference signal and output the phase-delayed reference signal. In detail, the phase delayer 207 may delay the reference signal 217 generated by the reference signal generator 201 based on a delay control signal provided by the filter 214, and output the delayed reference signal as the reception clock signal.

The phase comparator 209 may output a phase comparison output signal that is proportional to a phase difference between the reference signal 217 and the delayed reference signal.

The waveform generator 211 may generate the predetermined waveform signal, and change at least one of a slope or a period of the predetermined waveform signal. The waveform generator 211 may generate, as the predetermined waveform signal, a signal having a sawtooth waveform that increases from a set initial value during a set period T, returns to the initial value when the period T elapses, and repeats the increase and the return. When the signal having the sawtooth waveform is generated as the predetermined waveform signal, the negative feedback loop 205 may linearly increase a delay between the transmission clock signal and the reception clock signal for the period T.

The waveform generator 211 may generate, as the predetermined waveform signal, a signal having a quadratic waveform, for example, a quadratic waveform of square or cube, a signal having a polynomial or arbitrary waveform, or a signal having a linear waveform of which a slope varies for each period. The quadratic waveform may increase from a set initial value in a quadratic form during a set period T, return to the initial value when the period T elapses, and repeat the increase and the return.

When the signal having the quadratic waveform or the signal having the linear waveform is generated as the predetermined waveform signal, the pulse radar apparatus 200 may receive a high-resolution reflection signal from an object 223 in a case in which the object 223 is positioned at a relatively short distance, or may receive a low-resolution reflection signal from the object 223 in a case in which the object 223 is positioned at a relatively long distance.

When the signal having the quadratic waveform is generated as the predetermined waveform signal, the pulse radar apparatus 200 may detect an object positioned at a short distance more precisely, when compared to a linear waveform signal having the same period.

The error amplifier 213 may amplify a difference between the predetermined waveform signal and the phase comparison output signal.

The filter 214 may filter an output signal of the error amplifier 213 and output the filtered output signal to the phase delayer 207 as the delay control signal.

The negative feedback loop 205 may control the waveform generator 211 such that the difference between the predetermined waveform signal and the phase comparison output signal may be less than or equal to a set value, for example, a minimum value. The negative feedback loop 205 may operate to minimize or eliminate the difference between the predetermined waveform signal and the phase comparison output signal.

The receiver 215 may receive, through a reception antenna 227 or a transmission line, a reflection pulse 225, for example, an echo signal, received in response to the transmission pulse 221 being reflected from the object 223, and restore the reflection pulse 225 based on the reception clock signal, thereby acquiring information related to the object 223, for example, a position of the object 223, a distance from the object 223, and a shape of the object 223. To restore the received reflection pulse, the pulse radar apparatus 200 may iterate a process of applying the transmission clock signal and then the reception clock signal in sequential order.

The pulse radar apparatus 200 may flexibly control a delay between the transmission clock signal and the reception clock signal by delaying the transmission clock signal based on the delay control signal and using the delayed transmission clock signal as the reception clock signal, and adjusting the delay control signal through the negative feedback loop 205. In this example, to restore a reflection pulse received in a predetermined period to detect the object 223, the pulse radar apparatus 200 may adjust the delay between the transmission clock signal and the reception clock signal between a set minimum value and a set maximum value. A minimum distance and a maximum distance of the predetermined period may be determined based the set minimum value and the set maximum value.

The pulse radar apparatus 200 may restore the reflection pulse received in the predetermined period using various methods.

The pulse radar apparatus 200 may include the transmission antenna 219 and the reception antenna 227 that are separate from each other. However, example embodiments are not limited thereto. The pulse radar apparatus 200 may include a single transmission/reception antenna.

When the pulse radar apparatus 200 transmits or radiates the transmission pulse 221 through a medium of the transmission line, the transmitter 203 and the receiver 215 may be connected to the medium of the transmission line, whereby the pulse radar apparatus 200 may precisely measure a discontinuous characteristic of the medium of the transmission line.

For example, the pulse radar apparatus 200 may transmit the transmission pulse 221 to a metal rod implemented as the transmission line. When the receiver 215 is connected to the metal rod, the pulse radar apparatus 200 may precisely measure a discontinuous characteristic of a medium, for example, water, being in contact with the metal rod.

Figure 3:
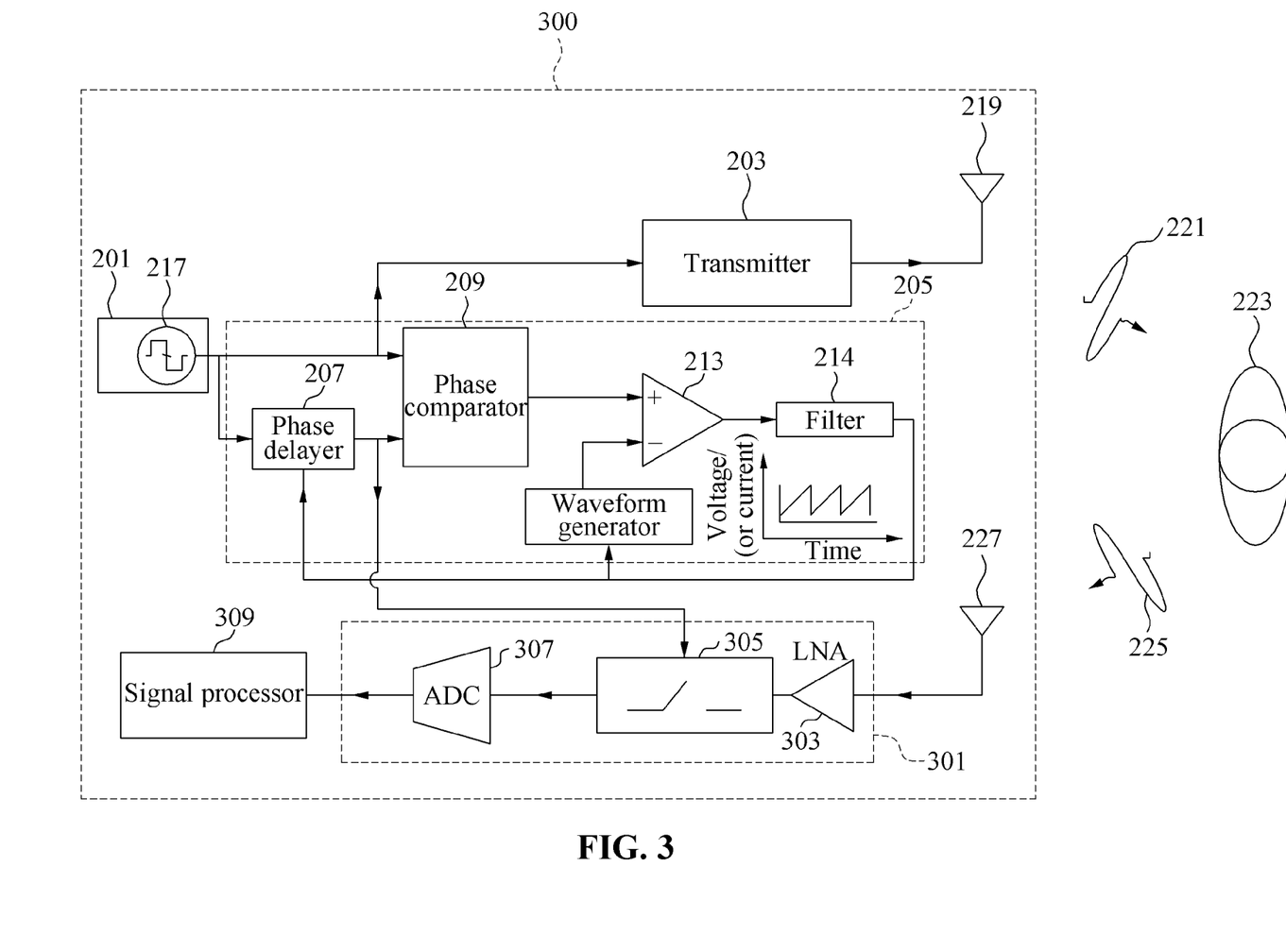
FIG. 3 is a diagram illustrating a configuration of a pulse radar apparatus according to an example embodiment.

FIG. 3 is a diagram illustrating a configuration of a pulse radar apparatus according to an example embodiment.

Referring to FIG. 3, a pulse radar apparatus 300 according to an example embodiment may include the reference signal generator 201, the transmitter 203, the negative feedback loop 205, a receiver 301, and a signal processor 309. A basic configuration of the pulse radar apparatus 300 may be the same as a configuration of the pulse radar apparatus 200 of FIG. 2, and thus duplicated description will be omitted herein for conciseness.

The pulse radar apparatus 300 may further include the signal processor 309, and the receiver 301 with a configuration different from that described with respect to the pulse radar apparatus 200, which will be described hereinafter.

The receiver 301 may include a low-noise amplifier 303, a high-speed broadband sampler 305, and a data converter 307, for example, an analog-to-digital converter (ADC).

The low-noise amplifier 303 may receive the reflection pulse 225 reflected from the object 223 through the reception antenna 227, and amplify the received reflection pulse 225.

The high-speed broadband sampler 305 may sample the amplified reflection pulse through a track and hold function based on the reception clock signal received from the phase delayer 207.

The data converter 307 may convert an output signal of the high-speed broadband sampler 305 into a digital signal.

The signal processor 309 may acquire information related to the object 223 based on an output signal of the data converter 307.

Figure 4:
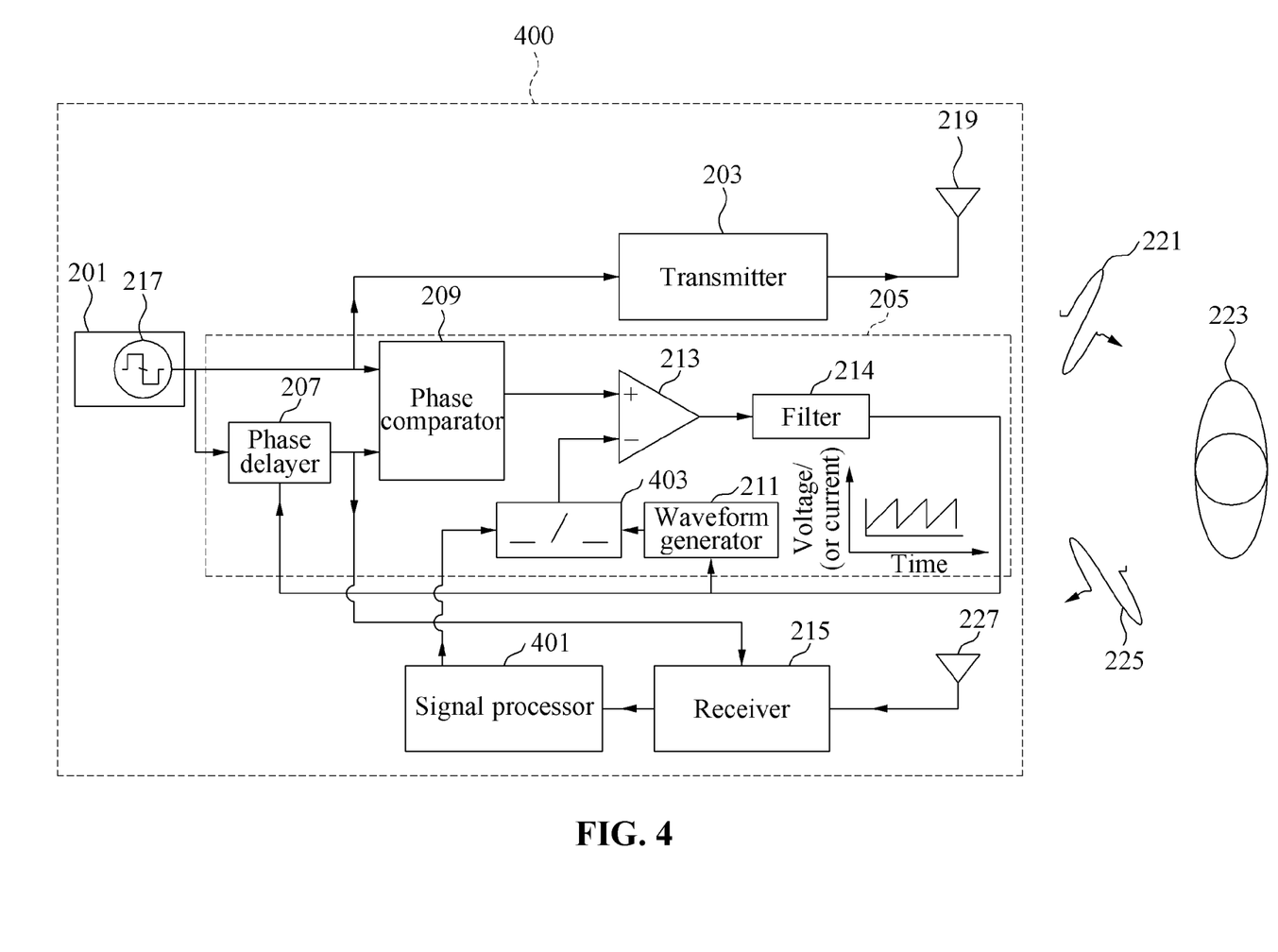
FIG. 4 is a diagram illustrating a configuration of a pulse radar apparatus according to an example embodiment.

FIG. 4 is a diagram illustrating a configuration of a pulse radar apparatus according to an example embodiment.

Referring to FIG. 4, a pulse radar apparatus 400 according to an example embodiment may include the reference signal generator 201, the transmitter 203, the negative feedback loop 205, and a signal processor 401. A basic configuration of the pulse radar apparatus 400 may be the same as the configuration of the pulse radar apparatus 200 of FIG. 2, and thus duplicated description will be omitted herein for conciseness.

The pulse radar apparatus 400 may further include the signal processor 401, and the negative feedback loop 205 with a configuration different from that described with respect to the pulse radar apparatus 200, which will be described hereinafter.

The negative feedback loop 205 may generate a delay control signal using one of the predetermined waveform signal generated by the waveform generator 211 or an external waveform signal generated by the signal processor 401 and a reference signal generated by the reference signal generator 201, and provide the generated delay control signal to the phase delayer 207.

The negative feedback loop 205 may include the phase delayer 207, the phase comparator 209, the waveform generator 211, a selector 403, the error amplifier 213, and the filter 214.

The phase delayer 207 may delay the reference signal 217 generated by the reference signal generator 201 based on the delay control signal provided by the filter 214.

The phase comparator 209 may output a phase comparison output signal that is proportional to a phase difference between the reference signal 217 and the delayed reference signal.

The waveform generator 211 may generate a predetermined waveform signal and provide the predetermined waveform signal to the selector 403. The waveform generator 211 may generate, as the predetermined waveform signal, a signal having a sawtooth waveform that increases from a set initial value during a set period, returns to the initial value when the period elapses, and repeats the increase and the return. The waveform generator 211 may generate, as the predetermined waveform signal, a signal having a quadratic waveform, for example, a quadratic waveform of square or cube, a signal having a polynomial or arbitrary waveform, or a signal having a linear waveform of which a slope varies for each period.

The selector 403 may select one of the predetermined waveform signal or the external waveform signal, and provide the selected signal to the error amplifier 213. The signal processor 211 and the waveform generator 401 may each have a different change range to change at least one of a slope or a period of a generated signal, for example, the predetermined waveform signal or the external waveform signal. Thus, the selector 403 may select one of the signals generated by the waveform generator 211 and the signal processor 401, the one having a change range corresponding to a set condition.

The error amplifier 213 may amplify a difference between the phase comparison output signal output from the phase comparator 209 and the signal provided by the selector 403, and output the amplified difference as the delay control signal.

The filter 214 may filter an output signal of the error amplifier 213, and output the filtered output signal to the phase delayer 207 as the delay control signal.

The signal processor 401 may be, for example, a microcontroller or a digital signal processor. The signal processor 401 may generate the external waveform signal based on a control of an external input signal, and provide the external waveform signal to the selector 403.

Figure 5:
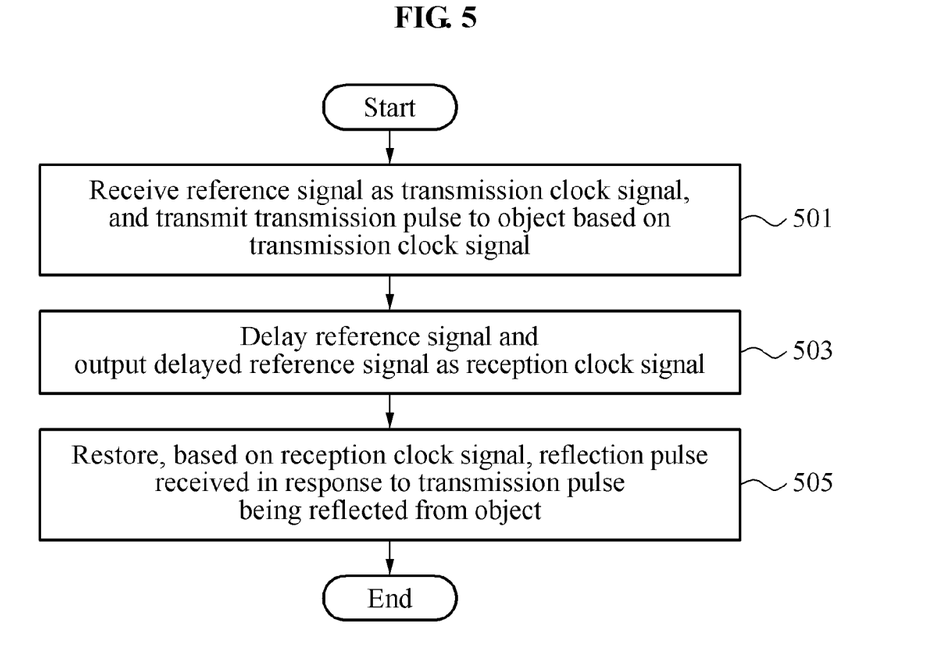
FIG. 5 is a flowchart illustrating an operating method of a pulse radar apparatus according to an example embodiment.

FIG. 5 is a flowchart illustrating an operating method of a pulse radar apparatus according to an example embodiment. The pulse radar apparatus may generate a reference signal continuously.

Referring to FIG. 5, in operation 501, the pulse radar apparatus may receive a reference signal as a transmission clock signal, and transmit a transmission pulse to an object based on the transmission clock signal.

In operation 503, the pulse radar apparatus may delay the reference signal, and output the delayed reference signal as a reception clock signal. The pulse radar apparatus may generate a delay control signal using the reference signal and a predetermined waveform signal generated by a waveform generator, delay the reference signal based on the delay control signal, and adjust the delay control signal by controlling the waveform generator to change the predetermined waveform signal and generate the changed predetermined waveform signal.

The pulse radar apparatus may output a phase comparison output signal that is proportional to a phase difference between the reference signal and a reference signal delayed by a phase delayer as a phase comparison output signal. The pulse radar apparatus may amplify a difference between the predetermined waveform signal and the phase comparison output signal, and provide the amplified difference to the phase delayer as the delay control signal.

In another example, the pulse radar apparatus may output a phase comparison output signal that is proportional to a phase difference between the reference signal and a reference signal delayed by a phase delayer as a phase comparison output signal. The pulse radar apparatus may select one of an external waveform signal generated by a signal processor and the predetermined waveform signal, amplify a difference between the selected signal and the phase comparison output signal, and output the amplified difference as the delay control signal. In this example, the signal processor and the waveform generator may each have a different change range to change at least one of a slope or a period of a generated signal. Thus, the pulse radar apparatus may select one of the respective signals generated by the signal processor and the waveform generator, the one having a change range corresponding to a set condition.

The pulse radar apparatus may generate the predetermined waveform signal through the waveform generator. In this example, the pulse radar apparatus may generate, as the predetermined waveform signal, a signal having a sawtooth waveform that increases from a set initial value during a set period, returns to the initial value when the period elapses, and repeats the increase and the return. When the signal having the sawtooth waveform is generated as the predetermined waveform signal, the pulse radar apparatus may linearly increase a delay between the transmission clock signal and the reception clock signal for the period.

The pulse radar apparatus may generate, as the predetermined waveform signal, a signal having a quadratic waveform or a signal having a linear waveform of which a slope varies for each period.

In operation 505, the pulse radar apparatus may restore, based on the reception clock signal, a reflection pulse received in response to the transmission pulse being reflected from the object.

The pulse radar apparatus may amplify the reflection pulse, perform a track and hold function with respect to the amplified reflection pulse based on the reception clock signal, and convert the pulse into a digital signal. The pulse radar apparatus may acquire information related to the object based on the digital signal.

According to an example embodiment, a delay between a transmission clock signal and a reception clock signal may be flexibly controlled by delaying the transmission clock signal based on a delay control signal and using the delayed transmission clock signal as the reception clock signal, and adjusting the delay control signal through a negative feedback loop.

According to an example embodiment, by controlling a delay between a transmission clock signal and a reception clock signal through a negative feedback loop, a change in an external environment, for example, a change in temperature, may be adaptively handled, an operation reliability of a radar which operates based on the transmission clock signal and the reception clock signal, and a separate compensation device or compensation circuit may be omitted, whereby an additional cost may be reduced and a size of product may be miniaturized.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

What is claimed is:

1. A pulse radar apparatus comprising:
   a transmitter configured to receive a reference signal as a transmission clock signal, and transmit a transmission pulse to an object based on the transmission clock signal;
   a negative feedback loop configured to receive the reference signal and output a delayed reference signal as a reception clock signal; and
   a receiver configured to restore, based on the reception clock signal, a reflection pulse received in response to the transmission pulse being reflected from the object,
   wherein the negative feedback loop is configured to generate a delay control signal using the reference signal and one of an external waveform signal and a predetermined waveform signal, the predetermined waveform signal being generated by a waveform generator, the predetermined waveform signal having a polynomial waveform, the negative feedback loop being further configured to adjust the delay control signal by controlling the waveform generator to change the predetermined waveform signal, and
   wherein the negative feedback loop comprises:
      a phase comparator configured to output a phase comparison output signal, the phase comparison output signal having a voltage or current value that is proportional to a phase difference between the reference signal and the delayed reference signal for the reception clock signal; and
      an error amplifier configured to receive the phase comparison output signal and amplify a difference between the phase comparison output signal and one of the predetermined waveform signal and the external waveform signal, and
   wherein the negative feedback loop is further configured to control the waveform generator to change at least one of a slope or a period of the predetermined waveform signal.

2. The pulse radar apparatus of claim 1, wherein the negative feedback loop is configured to operate to eliminate a difference between the predetermined waveform signal and the phase comparison output signal.

3. The pulse radar apparatus of claim 1, wherein the error amplifier is configured to amplify a difference between the predetermined waveform signal and the phase comparison output signal.

4. The pulse radar apparatus of claim 1, further comprising:
   a signal processor configured to generate the external waveform signal; and
   a selector configured to select one of the external waveform signal and the predetermined waveform signal,
   wherein the error amplifier is configured to amplify a difference between the selected signal and the phase comparison output signal.

5. The pulse radar apparatus of claim 1, wherein the receiver comprises:
   a low-noise amplifier configured to amplify the reflection pulse;
   a broadband sampler configured to sample the amplified reflection pulse based on the reception clock signal; and
   a data converter configured to convert an output signal of the broadband sampler into a digital signal.

6. The pulse radar apparatus of claim 1, wherein the waveform generator is configured to change at least one of a slope or a period of the predetermined waveform signal, and generate, as the predetermined waveform signal, a signal having a sawtooth waveform that increases from a set initial value during a set period, returns to the initial value when the period elapses, and repeats the increase and the return.

7. The pulse radar apparatus of claim 1, wherein the waveform generator is further configured to generate, as the predetermined waveform signal a signal having a linear waveform of which a slope varies for each period.

8. The pulse radar apparatus of claim 1, wherein the negative feedback loop further comprises a phase delayer configured to receive the reference signal and generate the delayed reference signal in response to the delay control signal.

9. The pulse radar apparatus of claim 8, wherein the negative feedback loop further comprises a filter configured to filter an output signal of the error amplifier and output the filtered output signal to the phase delayer as the delay control signal.

10. The pulse radar apparatus of claim 1, wherein the error amplifier has a first input receiving the phase comparison output signal and a second input receiving the predetermined waveform signal.

11. The pulse radar apparatus of claim 1, wherein the predetermined waveform signal is a quadratic waveform.

12. An operating method of a pulse radar apparatus, the method comprising:
   receiving a reference signal as a transmission clock signal, and transmitting a transmission pulse to an object based on the transmission clock signal;
   receiving the reference signal and outputting a delayed reference signal as a reception clock signal;
   restoring, based on the reception clock signal, a reflection pulse received in response to the transmission pulse being reflected from the object;
   generating a phase comparison output signal, the phase comparison output signal having a voltage or current value that is proportional to a phase difference between the reference signal and the delayed reference signal for the reception clock signal;
   receiving the phase comparison output signal and amplifying a difference between the phase comparison output signal and one of a predetermined waveform signal and an external waveform signal;
   generating a delay control signal using the reference signal and one of the predetermined waveform signal and the external waveform signal, the predetermined waveform signal being generated by a waveform generator, the predetermined waveform signal having a polynomial waveform;

adjusting the delay control signal by controlling the waveform generator to change the predetermined waveform signal; and controlling the waveform generator to change at least one of a slope or a period of the predetermined waveform signal.

13. The method of claim 12, wherein a difference between the predetermined waveform signal and the phase comparison output signal is amplified.

14. The method of claim 12, further comprising:
generating the external waveform signal by a signal processor; and
selecting one of the external waveform signal and the predetermined waveform signal,
wherein a difference between the selected signal and the phase comparison output signal is amplified.

15. The method of claim 12, further comprising:
generating, as the predetermined waveform signal, a signal having a sawtooth waveform that increases from a set initial value during a set period, returns to the initial value when the period elapses, and repeats the increase and the return; or
generating, as the predetermined waveform signal, a signal having a polynomial waveform or a signal having a linear waveform of which a slope varies for each period.

16. The method of claim 12, further comprising:
eliminating a difference between the predetermined waveform signal and the phase comparison output signal.

17. A pulse radar apparatus comprising:
a transmitter configured to receive a reference signal as a transmission clock signal, and transmit a transmission pulse to an object based on the transmission clock signal;
a negative feedback loop configured to receive the reference signal and output a delayed reference signal as a reception clock signal;
a receiver configured to restore, based on the reception clock signal, a reflection pulse received in response to the transmission pulse being reflected from the object;
a signal processor configured to generate an external waveform signal; and
a selector configured to select one of the external waveform signal and a predetermined waveform signal,
wherein the negative feedback loop is configured to generate a delay control signal using the reference signal and one of the external waveform signal and the predetermined waveform signal, the predetermined waveform signal being generated by a waveform generator, the negative feedback loop being further configured to adjust the delay control signal by controlling the waveform generator to change the predetermined waveform signal, and configured to operate to eliminate a difference between a selected signal by the selector and a phase comparison output signal, the phase comparison output signal having a value that is proportional to a phase difference between the reference signal and the delayed reference signal.

* * * * *